United States Patent Office 3,544,601
Patented Dec. 1, 1970

3,544,601
EPOXIDES
Edward George Gazzard and James Nairn Greenshields,
Manchester, England, assignors to Imperial Chemical
Industries Limited, London, England, a corporation
of Great Britain
No Drawing. Filed Jan. 31, 1968, Ser. No. 701,859
Claims priority, application Great Britain, Feb. 9, 1967,
6,175/67
Int. Cl. G07d 7/10
U.S. Cl. 260—345.9    8 Claims

ABSTRACT OF THE DISCLOSURE

Epoxides of the Formula I

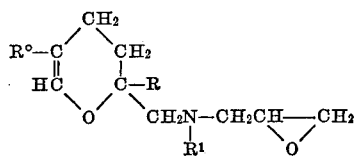

wherein $R^0$ and R represents hydrogen, hydrocarbon radicals or halogen atoms and $R^1$ represents hydrogen, a hydrocarbon radical, a group $R^4.CO$ wherein $R^4$ represents hydrogen or a hydrocarbon radical, or a group of the formula

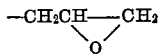

A process for the manufacture of said epoxides, polymerisation of said epoxides and use of said epoxides as adhesives.

---

This invention relates to new epoxides containing a dihydropyran nucleus, to the manufacture of such epoxides, and to their polymerisation and use.

According to the present invention there are provided epoxides of the general Formula I

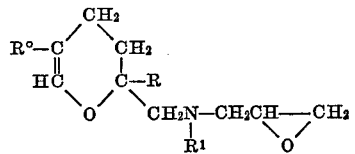

wherein $R^0$ and R represents hydrogen, hydrocarbon radicals or halogen atoms and $R^1$ represents hydrogen, a hydrocarbon radical, a group $R^4.CO$ wherein $R^4$ represents hydrogen or a hydrocarbon radical, or a group of the formula

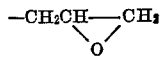

The term hydrocarbon radical includes alkyl, cycloalkyl, aralkyl, aryl and alkaryl radicals.

The symbols $R^0$, R and $R^1$ in the above general formula may all be the same or may be different in the same molecule.

Examples of radicals represented by $R^0$ and R which may be the same or different include hydrogen, methyl, ethyl, propyl, isopentyl, octyl, phenyl and chlorine.

Examples of radicals which may be represented by $R^1$ include hydrogen, methyl, ethyl, n-propyl, isopropyl, n-butyl, sec.-butyl, tert.butyl, isobutyl, pentyl, hexyl, dodecyl, cetyl, cyclohexyl, benzyl and phenyl and when $R^1=R^4CO$, $R^4$ may be for example hydrogen, methyl, ethyl, propyl, phenyl, benzyl, and p.toluyl. $R^1$ may also represent the group

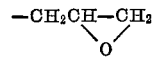

which may be referred to as the glycidyl group.

When $R^1$ represents hydrogen, a hydrocarbon radical or the group $R^4CO$ the epoxide of the present invention will be a monoepoxide and contain one glycidyl group, when $R^1$ represents the group

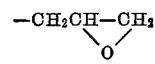

the epoxide of the invention will be a bis-epoxide and will contain two glycidyl groups.

Particularly valuable epoxides of the general Formula I are those wherein $R^0$ and R represent hydrogen or lower alkyl radicals with from 1 to 4 carbon atoms, especially those wherein $R^0$ and R represent hydrogen and $R^1$ represents hydrogen or the group

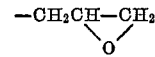

Examples of the epoxides of the present invention which have one glycidyl group include 3-(3,4-dihydro-2H-pyran-2-methylamino)-1,2-epoxy propane.

3 - (2,5 - dimethyl-3,4-dihydro-2H-pyran-2-methylamino)-1,2-epoxy propane.

3-(2,5-diethyl-3,4-dihydro-2H-pyran-2-methylamino)-1,2-epoxy propane.

3 - (N - ethyl-3,4-dihydro-2H-pyran-2-methylamino)-1,2-epoxy propane.

3 - (N-benzyl-3,4-dihydro-2H-pyran-2-methylamino)-1,2-epoxy propane and 3-(N-acetyl-3,4-dihydro-2H-pyran-2-methylamino)-1,2-epoxy propane.

The above compounds may be named in an alternative manner making use of the term glycidyl; in this case the first compound listed above would alternatively be named, N-glycidyl-2-aminomethyl-3,4-dihydro-2H-pyran.

Examples of epoxides of the present invention which contain two glycidyl groups are more conveniently named using the glycidyl terminology and include N-diglycidyl-2-aminomethyl-3,4-dihydro-2H-pyran,
N,N-diglycidyl-2-aminomethyl-2,5-dimethyl-3:4 - dihydro-2H-pyran,
N,N - diglycidyl - 2-aminomethyl-2,5-diethyl-3:4-dihydro-2H-pyran and
N,N-diglycidyl-2-aminomethyl-2,5-dichloro-3:4 - dihydro-2H-pyran.

The epoxides of the present invention may be manufactured by reacting a 2-aminomethyl-3,4-dihydro-2H-pyran or an N-mono substituted derivative thereof with epichlorohydrin.

Thus a further feature of the present invention there is provided a process for the manufacture of epoxides of the general Formula I as hereinbefore defined which comprises reacting a pyran derivative of the general Formula II.

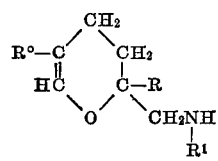

wherein $R^0$ and R are as hereinbefore defined and $R^1$ represents hydrogen, a hydrocarbon radical or a group $R^4.CO$ with epichlorohydrin and a dehydrohalogenation agent.

Examples of pyran derivatives of the general Formula

II which may be used as starting materials in the process of this invention includes:

2-aminomethyl-3,4-dihydro-2H-pyran.
2-aminomethyl-2,5-dimethyl-3,4-dihydro-2H-pyran.
2-aminomethyl-2,5-diethyl-3,4-dihydro-2H-pyran.
2-N-methylaminomethyl-3,4-dihydro-2H-pyran.
2-N-phenylaminomethyl-3,4-dihydro-2H-pyran.
2-N-cyclohexylaminomethyl-3,4-dihydro-2H-pyran.
2-N-benzylaminomethyl-3,4-dihydro-2H-pyran.
2-N-acetylaminomethyl-3,4-dihydro-2H-pyran.
2-N-benzoyl-aminomethyl-3,4-dihydro-2H-pyran and
2-aminomethyl-2,5-dichloro-3,4-dihydro-2H-pyran The reaction of the above pyran derivatives with epichlorohydrin may be carried out in the presence or absence of a solvent.

The dehydrohalogenation agent may be present throughout the reaction or may be added in the later stages to remove hydrohalide from the primary reaction product of the amine and epichlorohydrin.

Solvents which can be used include benzene, toluene, xylene, carbon tetrachloride, petroleum ether and diethyl ether.

Examples of dehydrohalogenation agents which may be used include basic materials such as sodium carbonate, sodium bicarbonate, sodium hydroxide, calcium oxide, calcium hydroxide, calcium carbonate, barium hydroxide, barium carbonate and anion exchange resins.

The reaction may be carried out by simply agitating the two reactants together, optionally with heating, although high temperatures are not necessarily required, adding an aqueous solution or suspension of an alkaline material to dehydrohalogenate and extracting the product with a water immiscible solvent. Alternatively the dehydrohalogenation agent may be added at the commencement of the reaction.

It will be realised that when the starting material of Formula II is an N-mono-substituted derivative of a 2-aminomethyl-3,4-dihydro-2H-pyran the product will contain one epoxide group and will be a monoglycidyl compound. An excess of epichlorohydrin can conveniently be used in such a case.

It will be further realised that when the starting material is a 2-aminomethyl-3,4-dihydro-2H-pyran without a substituent on the nitrogen atom then either one or two epoxide groups can be introduced into the molecule by reaction with epichlorohydrin giving rise to either a monoglycidyl or a diglycidyl compound. When it is desired to introduce only one such group an equimolecular proportion of epichlorohydrin will suffice although a small excess may be used. When it is desired to introduce two such groups at least two molecular proportions will be required and in practice it is preferred to use an excess over this amount.

The epoxides of the present invention are useful ingredients of compositions for the manufacture of polymeric materials as they contain two polymerisable groups of different natures, i.e. one or two epoxide groups and the double bond in the dihydropyran ring.

The products of the invention may be homopolymerised either by polymerisation of the epoxide group alone, or by polymerisation through the double bond in the dihydropyran ring and the epoxide group simultaneously.

Polymerisation through the epoxide group alone is carried out in the presence of a basic initiator or a combination of a basic catalyst and an initiator containing at least one active hydrogen group. Suitable catalysts include sodium or potassium metal, sodium or potassium hydroxide, basic oxides such as zinc oxide, calcium oxide and strontium oxide, sodamide and amines particularly secondary amines such as diethylamine, dibutylamine and piperidine, and tertiary amines for example triethylamine and triethanolamine. Suitable initiators containing at least one active hydrogen atom include alcohols, water and phenols. Polymerisation of the products of the present invention is also catalysed by peroxides, for example cumene hydroperoxide.

Catalysts for polymerisation of both groups simultaneously include Friedel Crafts catalysts for example stannic chloride or boron trifluoride or complexes of the latter with diethyl ether, dimethyl ether, dimethylamine, diethylamine, trimethylamine, triethylamine, dimethylbenzylamine, tripropylamine, laurylamine, stearylamine and morpholine, compounds of aluminum, magnesium or titanium containing halogen, alkyl, alkoxy or secondary amino groups, for example aluminum tri-isobutyl and or titanium tetrachloride.

The products of the present invention may be used as cross-linking agents for polymers containing pendant carboxylic acid, anhydride, amide, hydroxyl or vinyl ether groups. They may also be copolymerised with vinyl ethers to give cross-linked polymers.

The epoxides of the present invention have been found to be useful as adhesives for the bonding of a variety of materials such as steel, aluminum, copper, polypropylene and other metals and plastic material.

In using the epoxides of the present invention as adhesives the materials to be bonded are treated with a mixture comprising the epoxide and optionally a catalyst or are alternatively treated with two separate coatings, one of epoxide and one of catalyst and the treated materials are then held in contact and heated as desired, until a bond is formed. It is not essential to use catalysts when using the epoxides as adhesives or in adhesive compositions but catalysts may be used including the polymerisation catalysts listed above.

Examples of suitable catalysts include boron trifluoride etherate, stannic chloride and other Friedel Craft catalysts, tertiary amines and peroxides.

The invention is illustrated but not limited by the following examples in which all parts are by weight except where otherwise stated.

EXAMPLE 1

9.25 parts distilled epichlorohydrin are added, with stirring, to 11.30 parts 2-aminomethyl-3,4-dihydro-2H-pyran. The mixture is stirred at a temperature of 28° C. for 5 hours. The mixture is cooled to 20° C. and there is added 25 parts by volume of a 20% aqueous solution of potassium hydroxide. The mixture is stirred at this temperature for 1 hour. The aqueous layer is separated and discarded and the oily layer is stirred overnight with 30 parts by volume of sodium hydroxide solution (S.G. 1.35). The mixture is extracted several times with a total of 225 parts by volume of diethyl ether. The combined ether extracts are washed with water and are dried over anhydrous potassium carbonate. The ether is removed by distillation, under slight vacuum, and the residue is heated at 45° C. under 0.8 mm. mercury vacuum to leave a 12.0 parts viscous liquid residue consisting substantially of 3-(3,4-dihydro-2H-pyran-2-methylamino)-1,2-epoxypropane. The infra red absorption spectrum of this material shows absorptions consistent with the presence of dihydropyran rings and epoxide groups. Nuclear magnetic resonance spectra show that the product is substantially an epoxide of the formula I wherein $R^0$, R and $R^1$ are hydrogen and that it contains less than 5 mole percent of 1-chloro-2-hydroxy-3-(3,4-dihydro-2H-pyran-2-methylamine) propane and less than 10 mole percent of 1,3-bis (3,4-dihydro-2H-pyran-2-methylamino)-2-hydroxy propane.

EXAMPLE 2

Use of the product of Example 1 as an adhesive (a) The epoxide of Example 1 is coated onto bonderised steel strips previously treated for ten minutes in an aqueous acid potassium dichromate bath at 70° C. The strips are clipped together and are heated at 130° C. for 16 hours. The obtained bond is only broken with difficulty on exertion of manual pressure.

(b) 2.00 parts of the epoxide of Example 1 are mixed with 0.04 part triethylamine and are coated onto strips of (1) aluminum and (2) copper, treated as the steel of part (a) and (3) on flame treated polypropylene. The clipped aluminum/aluminum, copper/copper and polypropylene/polypropylene combination strips are heated as (a) above. The metal bonds cannot be broken by manual pressure and the polypropylene bond only with great difficulty.

The actual bond strengths obtained are as follows:

(1) aluminum/aluminum 630 lb./in.$^2$ (adhesive failure)
(2) copper/copper 470 lb./in.$^2$ (adhesive failure)
(3) polypropylene/polypropylene 355 lb./in.$^2$ (material failure).

(c) 2.00 parts of the epoxide of Example 1 are mixed with 0.04 part boron trifluoride etherate and are coated on bonderised steel, aluminum and copper strips treated as previously described. The clipped and baked bonds are not broken by manual pressure.

The bonded aluminum strips had a bond strength of 450 lb./in.$^2$ and the copper strips 350 lb./in.$^2$.

(d) 2.00 parts of the epoxide of Example 1 are mixed with 0.01 part of cumene hydroperoxide, the mixture coated on to aluminum strips treated as previously described, the bond obtained after baking as above had a strength of 680 lb./in.$^2$.

EXAMPLE 3

Preparation of

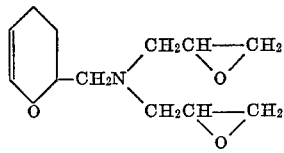

N,N-diglycidyl-2-aminomethyl-3:4-dihydro-2H-pyran 11.3 parts 2 - aminomethyl-3:4-dihydro-2H-pyran is added with stirring to 92.5 parts epichlorohydrin. The mixture is heated to 60° C. and held at this temperature for 5 hours. The mixture is cooled to 40° C. and excess epichlorohydrin is distilled off under full water vacuum. The residual mixture is cooled to room temperature and is stirred for one hour at room temperature with 29 parts of a 20% aqueous potassium hydroxide solution. The aqueous layer is separated and discarded and the remaining layer is stirred overnight with 40.5 parts sodium hydroxide solution (S.G. 1.35). To the stirred mixture is added 41.5 parts ether. The ether layer is separated and is washed with eight washes of 15 parts distilled water. The ether solution is dried with anhydrous sodium sulphate and the ether is removed, under water vacuum, at room temperature. The residue is then held at 25° C. for 1 hour under a vacuum of 0.2 mm. Hg to give 18.6 parts of a light brown colored liquid which possesses a nuclear magnetic resonance structure as expected for the indicated bis epoxide.

EXAMPLE 4

Preparation of 3-N(2,5-dimethyl-3:4-dihydro-2H-pyran-2-methyl)amino 1,2 epoxy propane 11.565 parts epichlorohydrin are added over 10 minutes to 17.625 parts 2-aminomethyl-2,5-dimethyl-3:4-dihydro-2H-pyran stirred at room temperature. The temperature is raised to 28–30° C. and stirring is continued for 2 hours. The mixture is cooled and there is added 16.7 parts aqueous sodium hydroxide solution (S.G. 1.35). The mixture is stirred for one hour and the aqueous layer is separated and is discarded. The residual organic layer is dissolved in 107 parts of diethyl ether and the ether solution is washed with 7× 35 parts saturated aqueous brine solution and is dried over anhydrous sodium sulphate. The ether is removed from the filtered solution by warming under vacuum. The liquid residue is heated at 65–70° C./0.2 mm. Hg for 1 hour to give 16.3 parts pale yellow mobile liquid. Nuclear Magnetic Resonance investigation of this product showed the presence of the 2,5-dimethyl-3:4-dihydro-2H-pyran moiety, the presence of ethyl groups adjacent to nitrogen and aliphatic protons adjacent to oxygen or chlorine. The infra-red absorption spectrum shows absorptions between 11 and 12μ. (909–833 cms.$^{-1}$) characteristic of epoxide groups but some hydroxyl absorption is present also.

EXAMPLE 5

Preparation of 3-N(2,5-dimethyl-3:4-dihydro-2H-pyran-2-methyl)amino 1,2 epoxy propane 14.1 parts 2 - aminomethyl-2,5-dimethyl-3:4-dihydro-2H-pyran and 46.2 parts epichlorohydrin are reacted together, with subsequent treatment, as in Example 7, to give 18.8 parts pale yellow liquid residue. The major component of this residue is shown, by nuclear magnetic resonance, to be 3-N-(2,5-dimethyl-3:4-dihydro-2H-pyran-2-methyl) amino-1,2-epoxy propane. The infra-red absorption supports this structure.

EXAMPLE 6

Preparation of 3[-N-ethyl-N-(3,4-dihydro-2H-pyran-2-methyl)]amino-1,2-epoxy propane 11.56 parts epichlorohydrin is added, over 10 minutes, to 17.625 parts 2-(N-ethyl) aminomethyl-3:4-dihydro-2H-pyran stirred at room temperature. The solution is heated to 28–30° C. and is held at this temperature for 2 hours. The mixture is cooled to room temperature and there is added 16.7 parts aqueous sodium hydroxide solution (S.G. 1.35). The mixture is stirred at 20° C. for 1 hour and the aqueous layer is separated and is discarded. 71.3 parts diethyl ether is added to dissolve the organic layer and the ether solution is washed with 3× 15 parts of water and is dried over anhydrous sodium sulphate. The ether solution is filtered and the ether is removed under vacuum. The obtained liquid residue is heated at 70–75° C./0.4 mm. Hg for 1 hour to give 5.0 parts of liquid residue. This residue is shown by nuclear magnetic resonance investigation to contain 3-[N-ethyl-N-(3,4-dihydro-2H-pyran-2-methyl)]amino-1,2-epoxypropane. Infra red analysis shows epoxide absorptions at 11.8–12.2μ.

EXAMPLE 7

Preparation of 3-[N-ethyl-N-(3,4-dihydro-2H-pyran-2-methyl)]amino-1,2-epoxy propane 12.7 parts N-ethyl - 2 - aminomethyl-3,4-dihydro-2H-pyran and 46.25 parts epichlorohydrin are run concomitantly and continuously, with the latter at approximately four times the rate of the former, into a stirred reaction flask maintained at 25° C. The resulting solution is stirred at this temperature for 5 hours. The mixture is then heated, under distillation conditions, at 57–60° C./0.2 mm. Hg for 1 hour. The mixture is cooled to room temperature, 29.5 parts aqueous potassium hydroxide solution (S.G. 1.18) is added and is stirred for 1 hour. 40.5 parts aqueous sodium hydroxide solution (S.G. 1.35) is then added and the mixture is stirred overnight. The product is extracted with 71.3 parts diethyl ether, the ether layer is separated, is washed with 2× 15 parts water and is dried over anhydrous sodium sulphate. The ether is filtered and is evaporated under vacuum to give 2.8 parts yellow mobile liquid residue. The nuclear magnetic resonance spectrum of this residue is substantially in agreement with the product being N-ethyl-3-N-(3:4-dihydro-2H-pyran - 2 - methyl)amino - 1,2 - epoxy propane. Infra red absorptions support this and shows no hydroxyl or secondary amine absorptions.

EXAMPLE 8

Preparation of 3-(3,4-dihydro-2H-pyran-2-methylamino)-1,2-epoxy propane 11.3 parts 2-aminomethyl-3:4 - dihydro - 2H - pyran is added to 92.5 parts epichlorohydrin stirred at 12° C. The solution is warmed to 28–30° C. and is stirred at this temperature for 5 hours. Excess epichlorohydrin is removed then by application of water-pump vacuum. The viscous opaque residue is stirred for 1 hour, at room temperature, with 29.5 parts aqueous potassium hydroxide solution (S.G. 1.18). The aqueous layer is separated and is discarded. The organic layer is stirred overnight, at room temperature, with 40.5 parts aqueous sodium hydroxide solution (S.G. 1.35). The aqueous layer is separated and is discarded. The organic layer is extracted with 71.3 parts diethyl ether, is washed with 20× 15 parts water and is dried over anhydrous sodium sulphate. The ether is removed under vacuum to have 13.0 parts liquid residue. The infra-red absorption spectrum of the residue shows bands at $10.95\mu$ and $11.75–12\mu$ as expected for epoxide groups and the expected dihydropyran absorptions. Nuclear magnetic resonance examination suggests that the product is largely 3-N-(3:4-dihydro-2H-pyran-2-methyl)amino-1,2-epoxy propane but also contains some diepoxide component.

EXAMPLE 9

Preparation of a mixture of the mono- and bis-epoxides from 2-aminomethyl-3,4-dihydro-2H-pyran 11.3 parts 2-aminomethyl - 3:4 - dihydro-2H-pyran is added to 18.5 parts epichlorohydrin stirred at room temperature. The mixture is warmed to 28–30° C. and is stirred at this temperature for 5 hours. The mixture is heated then, at this temperature, under distillation conditions, for 1 hour under a vacuum of 0.2 mm. Hg. 29.5 parts aqueous potassium hydroxide solution (S.G. 1.18) is added and the mixture is stirred at room temperature for 1 hour. The aqueous layer is separated and is discarded. The residue is stirred overnight with 40.5 parts aqueous sodium hydroxide solution (S.G. 1.35). The aqueous layer is separated and the organic residue is extracted with 71.3 parts diethyl ether. The ether layer is washed with 12× 15 parts water and is dried over anhydrous sodium sulphate. The filtered ether solution is evaporated under vacuum and the residue heated at 35° C./0.2 mm. Hg for 1 hour. The mobile yellow liquid residue, in yield of 16.0 parts, is shown by nuclear magnetic resonance analysis to be a 50/50 mixture of the mono- and bis-epoxide derivatives of the dihydropyran amine.

EXAMPLE 10

A preparation is carried out similar to that of example 8 but using 10.2 parts epichlorohydrin and 11.3 parts 2-aminomethyl-3:4-dihydro-2H-pyran to give 9.4 parts of a viscous liquid product.

0.5 part of this product is mixed with 0.01 part triethylamine and two drops of chloroform and is coated onto aluminium strips. The strips are held together and baked at 130° C. overnight. The joint thus prepared possesses a bond strength of 1120 lb./in.$^2$.

A similar mixture of 0.5 part product with 0.03 part cumene hydroperoxide and similarly formed into an aluminium joint gave a bond strength of 970 lb./in.$^2$. A similar mixture of 0.5 parts product with 0.02 part p-phenylene diamine gave a bond with tensile strength of 800 lb./in.$^2$.

EXAMPLE 11

3.0 parts of the amine epoxide product of Example 9 and 0.15 part of triethylamine are heated under reflux, in an atmosphere of nitrogen, at 120° C. for 2 hours. During this time the originally mobile liquor becomes viscous, the epoxide content falls but the dihydropyran ring absorption remains substantially unchanged.

3.0 parts of the same amine epoxide product of Example 9 and 0.15 part sodium methoxide, heated under like conditions, gives a solid residue with epoxide groups largely reacted whilst the dihydropyran ring absorptions remain the same.

EXAMPLE 12

56.5 parts 2-aminoethyl-3:4-dihydro - 2H - pyran and 50.0 parts epichlorohydrin were added simultaneously and continuously over 5 minutes to a stirred reaction flask maintained at 25° C. An exothermic reaction gives a temperature rise to 28° C. and the mixture is stirred at 26–28° C. for 4 hours. Excess epichlorohydrin is removed by vacuum distillation. The residue is stirred with 147.5 parts aqueous potassium hydroxide solution (S.G. 1.18) for 1 hour. The aqueous alkaline layer is removed and the residue is stirred, for 40 hours, with 202.5 parts aqueous sodium hydroxide solution (S.G. 1.35). The aqueous layer is removed and the residue is extracted with 357.5 parts diethyl ether. The ether solution is washed with 20× 20 parts water, is dried over sodium sulphate, is filtered and is vacuum distilled to give 34.3 parts mobile liquid residue. A sample of this residue is heated at 50° C./0.2 mm. Hg for a period up to 4 hours when removed samples show a progressive decrease in epoxide content.

EXAMPLE 13

102.0 parts epichlorohydrin and 56.5 parts 2-aminomethyl-3:4-dihydro-2H-pyran are added simultaneously, the latter at approximately half the rate of the former, to a stirred reaction flask held at 25° C. An exothermic temperature rise of 3.5° C. occurs. The mixture is allowed to stir for 5 hours. The mixture is distilled then at 28° C./0.3 mm. Hg. The residue is stirred at room temperature, overnight, with 147.5 parts aqueous potassium hydroxide solution (S.G. 1.18). 365.5 parts diethyl ether is added and the aqueous layer is removed and is discarded. The ether solution is washed with 20× 30 parts water and is dried over anhydrous sodium sulphate. The ether is filtered and is removed under water vacuum to give 108 parts liquid residue.

A mixture of 0.5 part this residue and 0.2 part triethylamine is coated onto aluminum strips which are clipped together and are baked at 150° C. overnight. The joint has a tensile strength of 1187 lb./in.$^2$. A similar bond with 0.5 part epoxide residue and 0.02 part cumene hydroperoxide possesses a bond strength of 400 lb./in.$^2$. A sample of the epoxide residue is heated for 2 hours at 50° C./0.3 mm. Hg. A mixture of this heated sample, similar to above, with triethylamine, gives an aluminium joint with a tensile strength of 1344 lb./in.$^2$ whilst a mixture with cumene hydroperoxide gives a bond with tensile strength 1200 lb./in.$^2$. A sample of the original epoxide residue heated 4 hours at 50° C./0.3 mm. Hg gave bonds strengths, for similar compositions, of 1533 lb./in.$^2$ and 1187 lb./in.$^2$ respectively.

EXAMPLE 14

22.6 parts 2-aminomethyl-3:4-dihydro-2H-pyran and 92.5 parts epichlorohydrin are added concomitantly and continuously, the former at apporixmately a quarter of the rate of the latter, to 176 parts benzene stirred at 25° C. The mixture is heated, with stirring, to 60° C. and is held at this temperature for 5 hours. The mixture is then distilled under water-pump pressure to remove benzene and then at 0.3 mm. Hg pressure to remove excess epichlorohydrin. The residue (I), 55 parts, is divided into approximately equal portions (a) 27 parts residue I is stirred at room temperature with 29.5 parts aqueous potassium hydroxide solution (S.G. 1.18) for 1 hour. The aqueous layer is separated and is discarded. The organic residue is stirred, overnight, at room temperature, with 40.6 parts aqueous sodium hydroxide solution (S.G. 1.35). The aqueous layer is separated and is discarded. The organic layer is extracted with 71.3 parts diethyl ether and the ether solution is washed with 20× 15 parts water and is dried over anhydrous sodium sulphate. Removal of the ether, under vacuum, from the filtered solution, followed by heating 1 hour at 30° C./0.2 mm. Hg gives 15.3 parts pale yellow mobile residue.

(b) 28 parts residue I is dissolved in 132 parts benzene and there is added, with stirring, 29.5 parts aqueous potassium hydroxide solution (S.G. 1.18). The mixture is stirred for 1 hour and the aqueous layer is separated and is discarded. The benzene solution is stirred overnight with 40.6 parts aqueous sodium hydroxide solution (S.G. 1.35). Again the aqueous layer is separated and is discarded. The benzene layer is dried over anhydrous sodium sulphate and is filtered. Benzene is distilled off under vacuum and the residue is heated for 1 hour at 30° C./0.2 mm. Hg to give 18.0 parts mobile liquid residue.

Both residues show the presence of epoxide groups the latter product showing a slightly higher epoxide content than the former.

What we claim is:

1. Epoxides having the formula

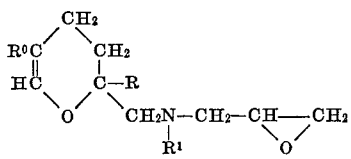

wherein $R^0$ and R represent hydrogen, lower alkyl radical having 1–4 carbon atoms or chlorine and $R^1$ represents hydrogen or

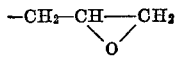

2. Epoxides having the formula

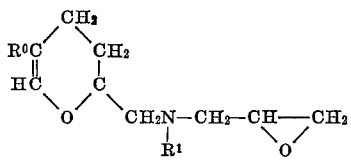

wherein $R^0$ and R represent hydrogen and $R^1$ represents hydrogen, lower alkyl radical having 1–4 carbon atoms or

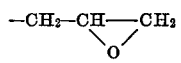

3. Epoxides as claimed in claim 2 wherein $R^0$ and R represent hydrogen and $R^1$ represents hydrogen or the group

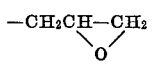

4. The epoxide 3-(3,4-dihydro - 2H - pyran-2-methylamino)-1,2-epoxy propane.

5. The epoxide N,N-diglycidyl - 2 aminomethyl-3,4-dihydro-2H-pyran.

6. The epoxide 3-N(2,5 - dimethyl - 3,4-dihydro-2H-pyran-2-methyl)amino-1,2-epoxy propane.

7. The epoxide 3[-N-ethyl-N(3,4-dihydro-2H-pyran-2 methyl)]amino-1,2-epoxy propane.

8. Mixtures of the epoxides claimed in claims 4 and 5.

References Cited

UNITED STATES PATENTS

| | | | |
|---|---|---|---|
| 3,008,964 | 11/1961 | Guest et al. | 260—345.9X |
| 3,232,901 | 2/1966 | Holm et al. | 260—345.8X |
| 3,240,720 | 3/1966 | Smith | 260—348.6X |
| 3,257,249 | 6/1966 | Israel et al. | 260—348.6X |

NORMA S. MILESTONE, Primary Examiner

U.S. Cl. X.R.

260—2